United States Patent Office 3,657,337
Patented Apr. 18, 1972

3,657,337
BENZYLIDENEAMINO GUANIDINES
William J. Houlihan and Robert E. Manning, Mountain Lakes, N.J., assignors to Sandoz-Wander, Inc., Hanover, N.J.
No Drawing. Filed Dec. 4, 1967, Ser. No. 687,425
Int. Cl. C07c 125/08
U.S. Cl. 260—551 C
8 Claims

ABSTRACT OF THE DISCLOSURE

This disclosure pertains to dichlorobenzylideneamino guanidines, e.g., 1 - (2,6 - dichlorobenzylideneamino)-3-methyl guanidine. These compounds are useful as hypotensives.

---

This invention relates to novel heterocyclic compounds. In particular, the invention pertains to benzylideneamino guanidines, intermediates therefor, and to methods for their preparation.

The compounds of this invention may be represented by the following structural formula:

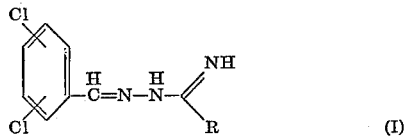
(I)

and certain acid addition salts thereof, where

R represents loweralkylamino, cyanoamino, hydrazino or loweralkylthio.

The term "loweralkyl" as used herein is intended to represent alkyl radicals containing 1–5 carbon atoms, e.g., methyl, ethyl, isopropyl, butyl, and the like.

The compounds of Formula I may be prepared by several processes, depending upon the group represented by R. Those compounds of Formula I wherein R represents loweralkyl, cyano or amino may be prepared from those compounds of Formula I in which R represents loweralkylthio, and from acid addition salts thereof. The reaction may be generally represented as follows:

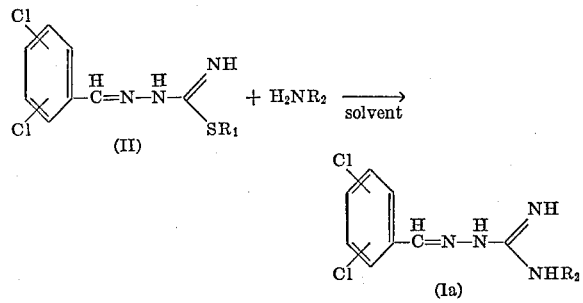

where $R_1$ represents loweralkyl and $R_2$ represents loweralkyl, cyano or amino.

The compounds of Formula Ia where $R_2$ is loweralkyl or its acid addition salt may be prepared from the compounds of Formula II or an acid addition salt thereof by treating the latter with a primary loweralkylamine, such as methylamine or ethylamine, at a temperature of about 40° C.–100° C., preferably 50° C.–80° C. The reaction may be conducted in solvents such as alcohols, e.g., loweralkanols such as ethanol or isopropanol, or in aqueous mixtures thereof. Neither the particular solvent nor the reaction temperature is critical. The product may be recovered using conventional techniques, such as filtration. The acid addition salt may be obtained from the free base by salifying.

When a compound defined according to Formula II or an acid addition salt thereof is treated with hydrazine, the resulting product is of Formula Ia in which $R_2$ represents amino or its acid addition salt. The temperature of reaction may be about 30° C.–100° C. and is preferably 50° C.–70° C. Solvent such as alcohols, e.g., loweralkanols, may be used but neither the particular solvent nor the reaction temperature is considered critical in obtaining the desired product. The product is readily recovered using standard techniques. The free base may be converted to a desired acid addition salt by salification.

The compound of Formula Ia where $R_2$ represents cyano may be prepared from the compounds of Formula II by reaction with cyanamide at about 40° C.–100° C., preferably 50° C.–80° C., in solvent such as a loweralkanol. The particular solvent or temperature is not critical. Conventional methods may be used in recovering the product.

The compounds defined according to Formula II are prepared by treating a dichlorobenzaldehydethiosemicarbazone of the formula:

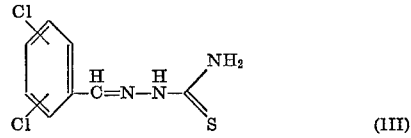
(III)

with a loweralkyl halide preferably the bromide or iodide, such as methyl iodide, methyl bromide, ethyl iodide and the like. This reaction may be conducted in solvent such as methylene chloride, tetrahydrofuran, benzene, alcohols, e.g., loweralkanols, and the like, from about room temperature to about 80° C., preferably 50° C.–70° C. Neither the particular solvent nor the reaction temperature is critical.

Some of the compounds (III) are known and are prepared according to methods disclosed in the literature. Those of the compounds of Formula III not specifically disclosed may be prepared by treating appropriately substituted dichlorobenzaldehyde with thiosemicarbazide in solvent such as ethanol at reflux temperature. Conventional techniques are used to recover the product (III).

The above referred to acid addition salts of compounds (II) are strong mineral acid addition salts, e.g., the hydrogen halides such as the hydrogen chloride, hydrogen iodide or hydrogen bromide. The compounds of Formula II and those of Formula Ia where $R_2$ represents loweralkyl or amino may be recovered as an acid addition salt; and, if desired, they may be converted to the free base using conventional techniques, such as by treating the salt with sodium carbonate solution in methanol and collecting the solid obtained upon concentration.

The compounds represented by Formula Ia above are useful because they possess pharmaceutical properties in animals. In particular, these compounds are useful as hypotensives, as indicated by their activity in anesthetized cat tested by blood pressure measurement using a mercury manometer or transducer via a catheter inserted in the carotid or femoral artery. When so utilized, the compounds may be combined with one or more pharmaceutically acceptable carriers or adjuvants. They may be administered orally or parenterally and, depending upon the compound employed and the mode of administration, the exact dosage utilized may vary.

Furthermore, these compounds (Ia) where $R_2$ is loweralkyl or amino may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

In general, satisfactory results are obtained when these active compounds are administered at a daily dosage of about 0.1 milligram to about 20.0 milligrams per kilogram of animal body weight. This daily dosage is preferably administered 2 to 4 times a day, or in sustained release form. For most large mammals such as primates, the total daily dosage is from about 10 milligrams to about 450 milligrams. Dosage forms suitable for internal use comprise from about 2.5 milligrams to about 225 milligrams of the active compound in intimate admixture with a solid or liquid pharmaceutically acceptable carrier or diluent.

A representative formulation suitable for oral administration in a tablet prepared by standard tabletting techniques which contains the following:

| Ingredient: | Parts by weight |
|---|---|
| 3 - amino - 1-(2,6-dichlorobenzylideneamino) guanidine hydroiodide | 30 |
| Tragacanth | 2 |
| Lactose | 59.5 |
| Corn starch | 5 |
| Talcum | 3 |
| Magnesium stearate | 0.5 |

The following examples are provided for the purpose of illustration and not by way of limitation. They are not intended so as to limit the scope of the invention as defined in the appended claims.

EXAMPLE 1

3-(2,6-dichlorobenzylideneamino)-2-methyl-2-thiopsuedourea

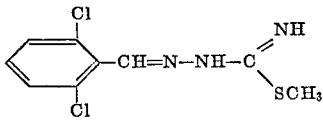

A mixture of 2,6-dichlorobenzaldehyde (105 g.), thiosemicarbazide (54 g.) and ethanol (2 liters) is refluxed for 2 hours. The solution is cooled and the resultant solid is collected by filtration to afford 137 g. of 2,6-dichlorobenzaldehydethiosemicarbazone; M.P. 237-238° C. with decomposition.

A mixture of 2,6- dichlorobenzaldehydethiosemicarbazone (48.5 g.), methyl iodide and ethanol (500 ml.) is refluxed for 2½ hours. The solution is cooled and the resultant solid is collected by filtration to give 41.2 g. of 3 - (2,6 - dichlorobenzylideneamino) - 2-methyl-2-thiopsuedourea hydroiodide; M.P. 209-210° C.

A mixture of 21 g. of the above salt, water (100 ml.), 2 N Na$_2$CO$_3$ solution (100 ml.), and 100 ml., of methanol is stirred for ½ hour. The solution is concentrated to ½ volume in vacuo. The resultant solid is collected by filtration to give 8.3 g. of 3-(2,6-dichlorobenzylideneamino) - 2 - methyl - 2 - thiopsuedourea; M.P. 78-80° C.

EXAMPLE 2

1-(2,6-dichlorobenzylideneamino)-3-methyl guanidine

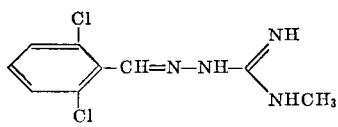

A mixture of 3(2,6-dichlorobenzylideneamino)-2-methyl-2-thiopsuedourea hydroiodide (2 g.), 5 ml. ethanol and 5 ml. 40% aqueous methylamino is stirred for 6 hours. The mixture is cooled in an ice bath and the resultant solid is collected by filtration to give 0.8 g. of 1 - (2,6 - dichlorobenzylideneamino)-3-methyl guanidine; M.P. 169-171° C.

EXAMPLE 3

3-amino-1-(2,6-dichlorobenzylideneamoin)-guanidine hydroiodide

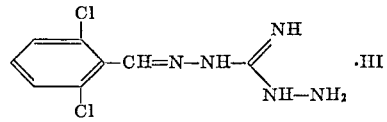

A mixture of 3-(2,6-dichlorobenylideneamino)-2-methyl-2-thiopsuedourea hydroiodide (3.9 g.), hydrazine (0.33 g.) and ethanol (20 ml.) is refluxed for 3½ hours. The reaction mixture is then cooled to give 0.9 g. of crystalline solid 3 - amino - 1-(2,6-dichlorobenzylideneamino) guanidine hydroiodide; M.P. 206-208° C. with decomposition.

EXAMPLE 4

1-(2,6-dichlorobenzylideneamino)-3-cyano-guanidine

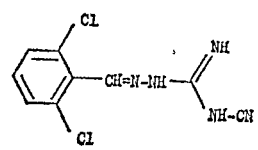

A mixture of 3-(2,6-dichlorobenzylideneamino)-2-methyl-2-thiopsuedourea (2.6 g.) cyanamide (0.42 g.) and ethanol (15 g.) is refluxed overnight. The solution is cooled and the resultant solid is collected by filtration to give 0.9 g. of 1-(2,6-dichlorobenzylideneamino)-3-cyano-guanidine; M.P. 218-219° C.

What is claimed is:

1. A compound of the formula

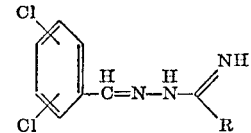

where
R represents loweralkylamino, cyanoamino, hydrazino, or loweralkylthio, wherein loweralkyl represents alkyl radicals having 1 to 5 carbon atoms,
and when R is loweralkylamino or hydrazino, pharmaceutically acceptable acid addition salts thereof, and when R is loweralkylthio, strong mineral acid addition salts thereof.

2. A compound of the formula

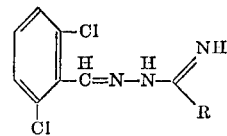

where
R represents loweralkylamino, cyanoamino, hydrazino, or loweralkylthio, wherein loweralkyl represents alkyl radicals having 1 to 5 carbon atoms,
and when R is loweralkylamino or hydrazino, pharmaceutically acceptable acid addition salts thereof, and when R is loweralkylthio, strong mineral acid addition salts thereof.

3. The compound according to claim 1 which is 3-(2,6-dichlorobenzylideneamino)-2-methyl-2-thiopsuedourea.

4. The compound according to claim 1 which is 1-(2,6-dichlorobenzylideneamino)-3-methyl-guanidine.

5. The compound according to claim 1 which is 3-amino-1-(2,6-dichlorobenzylideneamino)-guanidine.

6. The compound according to claim 1 which is 1-(2,6-dichlorobenzylideneamino)-3-cyano-guanidine.

7. A compound of the formula

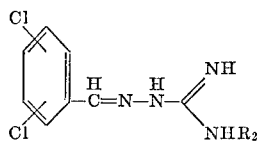

and pharmaceutically acceptable acid addition salts thereof,
where
$R_2$ represents loweralkyl having 1 to 5 carbon atoms, cyano or amino.

8. A member selected from the group consisting of a compound of the formula

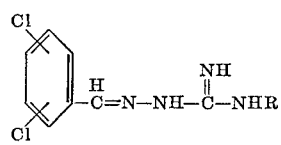

where R is lower alkyl and a pharmaceutically acceptable acid addition salt thereof.

References Cited

UNITED STATES PATENTS 3,419,659  12/1968  Catino et al. _____ 260—551

HENRY R. JILES, Primary Examiner

H. I. MOATZ, Assistant Examiner

U.S. Cl. X.R.

260—564 E, 564 F; 424—320, 326